2,533,871

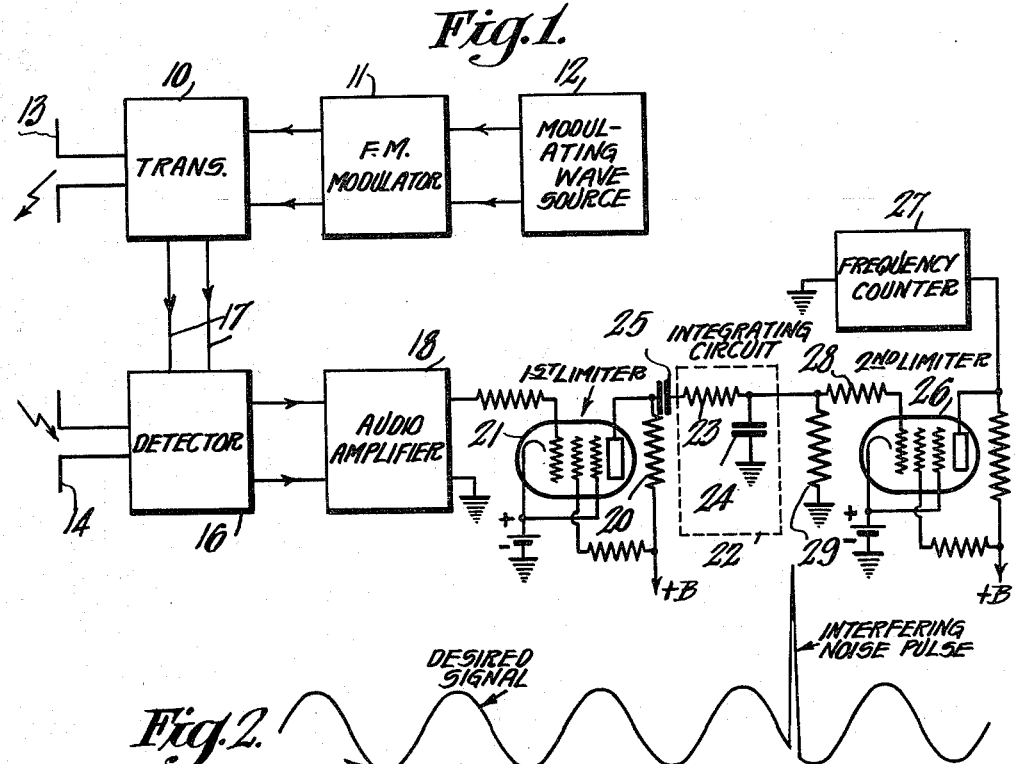
Fig. 1.
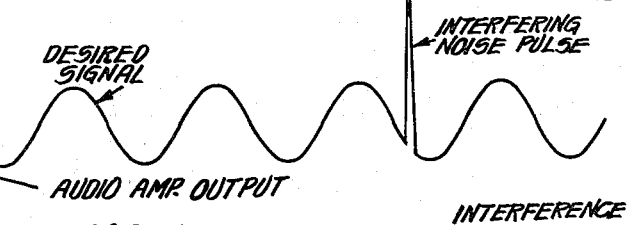
Fig. 2. AUDIO AMP. OUTPUT
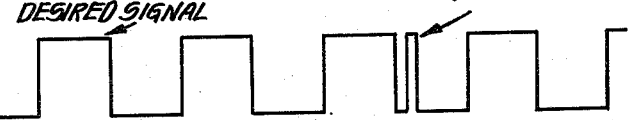
Fig. 3. 1ST LIMITER OUTPUT
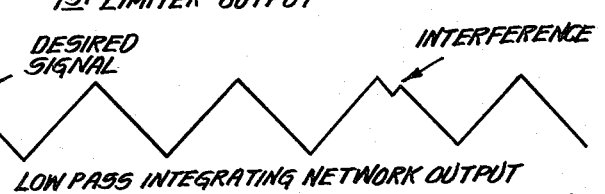
Fig. 4. LOW PASS INTEGRATING NETWORK OUTPUT
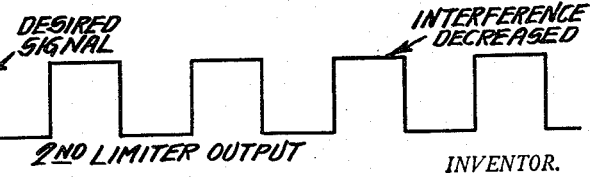
Fig. 5. 2ND LIMITER OUTPUT
INVENTOR.
Daniel Blitz
BY
ATTORNEY Patented Dec. 12, 1950

UNITED STATES PATENT OFFICE 2,533,871

RADIO DISTANCE MEASURING SYSTEM

Daniel Blitz, Princeton, N. J., assignor to Radio Corporation of America, a corporation of Delaware Application June 16, 1944, Serial No. 540,654

9 Claims. (Cl. 343—14)

My invention relates to radio distance measuring systems and particularly to frequency-modulated radio altimeter or radar systems.

In systems of this type, interfering noise signals may introduce an error in the distance indication, particularly when the system employs a frequency counter to measure the beat frequency and thus indicate the distance to the radio wave reflecting surface.

An object of the present invention is to provide an improved method of and means for reducing the effect of interfering signals or noise in a frequency-modulated radio altimeter or radar system.

In practicing a preferred embodiment of the invention, the beat frequency signal from the detector of a frequency-modulated altimeter or radar system is passed through a limiter to produce a square wave signal in the usual way. Instead of applying this square wave signal and any interfering signals mixed therein directly to a frequency counter, it is passed through an integrating circuit to produce a triangular wave signal which is changed only slightly in wave form by the interfering signals assuming their energy content after limiting is not large. The triangular wave is then passed through a second limiter to obtain square waves which are applied to a frequency counter.

The invention will be better understood from the following description taken in connection with the accompanying drawing in which Figure 1 is a block and circuit diagram of a frequency-modulated altimeter embodying the invention, Figure 2 is a graph showing the audio beat frequency signal and an accompanying interfering noise signal or pulse, and Figures 3, 4 and 5 are graphs showing the signals that are obtained after passing the beat frequency signal and the accompanying interfering signal through a first limiter, an integrating circuit and a second limiter, respectively.

Fig. 1 illustrates an embodiment of the invention as applied to a frequency-modulated altimeter comprising a radio transmitter 10 which is cyclically frequency modulated by means of a frequency-modulator unit 11 and a frequency-modulating wave source 12. The frequency-modulated wave is radiated from a transmitting antenna 13 toward the ground or other radio wave reflecting surface and the reflected wave is picked up by a receiving antenna 14 and supplied to a beat frequency detector 16.

The frequency-modulated signal is also supplied directly from the transmitter 10 over conductors 17 to the detector 16 whereby a beat frequency signal, such as that illustrated in Fig. 2, is obtained. As is well understood in the art, the beat frequency is a function of the distance to the reflecting surface or object. As indicated in Fig. 2, the beat frequency signal may have noise or other interfering signals or pulses of substantial amplitude mixed in with it.

As in the usual frequency-modulated altimeter, the signal output of detector 16 is amplified by an audio frequency amplifier 18 and passed through an amplitude limiting tube 21 to produce the square wave signal shown in Fig. 3 with the interfering signal reduced in amplitude to that of the signal. In the usual FM altimeter this square wave signal is then applied to a frequency counter, and an error in the frequency count may be introduced by the interfering noise pulse.

In accordance with the present invention, the square wave output of the first limiter 21 appearing across the plate resistor 20 is passed through a coupling capacitor 25 to an integrating circuit 22 which may consist of a series resistor 23 and a shunt capacitor 24. Thus the square wave signal is converted to a triangular wave signal such as that shown in Fig. 4 whereby the integrated noise pulse appears merely as a slight irregularity or discontinuity in the slope on one side of a triangular wave because of its comparatively short duration.

The triangular wave output of the integrating circuit is then passed through a second amplitude limiting tube 26 which has in its input circuit a grid current limiting resistor 28 and a grid leak resistor 29. Thus, a second square wave signal, such as that shown in Fig. 5, is obtained with the noise signal still further reduced due to limiting. This square wave signal is then applied to a frequency counter 27 or other suitable frequency indicating circuit. Preferably, a frequency counter of the general type described in the Sanders and Schwartz et al. Patents 2,228,367 and 2,137,859, respectively, is employed.

It is desirable to make the capacity of the coupling capacitor 25 small enough to prevent any substantial amount of signal at the frequency-modulation sweep rate from passing into the integration circuit 22. The reason for this is that at the end of each FM sweep the beat frequency signal will probably end at a different part of a beat frequency cycle whereby an undesired signal component at the sweep rate is produced which may introduce an error in the distance indication if not filtered out.

It will be apparent that the wave shape of the second square wave (Fig. 5) is substantially independent of any interfering noise pulse or signal. This will be true so long as the duration of the interfering noise pulses is fairly small compared with the duration of the desired beat frequency period. It will be evident that by employing the steps of integrating the first square wave signal and then limiting a second time, the possibility of obtaining false frequency counts is substantially reduced.

The following circuit values are given merely by way of example for a system employing a frequency-modulation sweep rate of 120 per second and in which the frequency range of the beat frequency signal from the detector 16 is from about 5000 cycles per second down to about 300 or 500 cycles per second:

| | | |
|---|---|---|
| Plate resistor 20 | ohms | 100,000 |
| Capacitor 25 | micro-microfarads | 5600 |
| Resistor 23 | ohms | 500,000 |
| Capacitor 24 | micro-microfarads | 220 |
| Resistor 28 | ohms | 820,000 |
| Resistor 29 | megohm | 1 |

I claim as my invention:

1. The method of reducing the effects of interfering signals in a signal the frequency of which is to be measured which comprises limiting the mixture of desired signal and interfering signal to produce an amplitude limited signal, integrating said amplitude limited signal to produce an integrated signal, and limiting said integrated signal to produce a second amplitude limited signal whereby the frequency of said second amplitude limited signal may be determined substantially independently of any effects of said interfering signal so that the frequency of said desired signal is determined.

2. Apparatus for measuring the frequency of a signal that is mixed with interfering signals comprising means for limiting the mixture of desired signal and interfering signal to produce an amplitude limited signal, means for integrating said amplitude limited signal to produce an integrated signal, means for limiting said integrated signal to produce a second amplitude limited signal, and means for determining the frequency of said second amplitude limited signal whereby the frequency of said desired signal is determined.

3. The invention according to claim 2 wherein said last means is frequency counter.

4. In a frequency-modulated distance measuring system wherein a signal having a beat frequency representative of the distance to a reflecting object is produced, the method of reducing the effects of interfering signals which comprises clipping said beat frequency signal to produce a square wave, integrating said square wave to produce a triangular wave, and clipping said triangular wave to produce a second square wave whereby the frequency of said second square wave may be determined substantially independently of any effects of said interfering signals so that said distance is determined.

5. A frequency-modulated distance measuring system comprising means for producing a signal having a beat frequency representative of the distance to a reflecting object, means for clipping said beat frequency signal to produce a square wave signal, means for integrating said square wave signal to produce a triangular wave signal, means for clipping said triangular wave signal to produce a second square wave signal, and means for determining the frequency of said second square wave whereby said distance is determined.

6. The invention according to claim 5 wherein said last means is a frequency counter.

7. A radio distance measuring system comprising means for transmitting a cyclically frequency-modulated wave toward a reflecting object, means for receiving said wave after reflection from said object, means for heterodyning said received wave with frequency-modulated signal transmitted direct from said transmitting means to produce a beat frequency signal, means for amplitude limiting said beat frequency signal, means for integrating said amplitude limited signal, means for amplitude limiting the integrated signal to produce a second amplitude limited signal, a frequency counter, and means for applying said second amplitude limited signal to said frequency counter.

8. A radio distance measuring system comprising means for transmitting a cyclically frequency-modulated wave toward a reflecting object, means for receiving said wave after reflection from said object, means for heterodyning said received wave with frequency-modulated signal transmitted direct from said transmitting means to produce a beat frequency signal, means for clipping said beat frequency signal to produce a square wave signal, means for integrating said square wave signal, means for clipping the integrated signal to produce a second square wave signal, a frequency counter, and means for applying said second square wave signal to said frequency counter.

9. The invention according to claim 8 wherein means is provided for filtering out of the beat frequency signal after it has been clipped any signal component having a frequency as low as the cyclic rate of said frequency modulation.

DANIEL BLITZ.

REFERENCES CITED

The following references are of record in the file of this patent:

UNITED STATES PATENTS

| Number | Name | Date |
|---|---|---|
| 2,307,316 | Wolff | Jan. 5, 1943 |
| 2,362,503 | Scott | Nov. 14, 1944 |